(12) United States Patent
Park

(10) Patent No.: US 6,980,639 B2
(45) Date of Patent: Dec. 27, 2005

(54) INAP PROCESSING METHOD FOR COMMUNICATION BETWEEN SSP AND TCAP

(75) Inventor: Jae-Han Park, Kyungki-Do (KR)

(73) Assignee: LG Electronics Inc., Seoul (KR)

(*) Notice: Subject to any disclaimer, the term of this patent is extended or adjusted under 35 U.S.C. 154(b) by 608 days.

(21) Appl. No.: 09/801,836

(22) Filed: Mar. 9, 2001

(65) Prior Publication Data

US 2001/0046285 A1 Nov. 29, 2001

(30) Foreign Application Priority Data

Mar. 9, 2000 (KR) .................... 2000-11852

(51) Int. Cl.[7] ............................ H04M 7/00; H04M 3/42
(52) U.S. Cl. ............. 379/230; 379/207.02; 379/221.08
(58) Field of Search ...................... 379/220.01, 221.08, 379/221.09, 221.12, 221.14, 229

(56) References Cited

U.S. PATENT DOCUMENTS 6,122,363 A * 9/2000 Friedlander et al. ........ 379/230
6,553,427 B1 * 4/2003 Chang et al. ............... 719/314
6,687,364 B1 * 2/2004 Lehtinen ..................... 379/219

* cited by examiner

Primary Examiner—Ahmad F. Matar
Assistant Examiner—Hector Agdeppa
(74) Attorney, Agent, or Firm—Fleshner & Kim, LLP

(57) ABSTRACT

An INAP processing method for communication between a SSP and TCAP. When an INAP message is sent from the INAP of the SSP to the TCAP, a TC component to be transmitted is generated, an invoke ID and dialogue ID are allocated to the generated TC component, and a TC primitive corresponding to the state of an allocated dialogue is created and encoded, to be sent to the TCAP through the TCAP interface block. When the INAP of the SSP receives an INAP message from the TCAP, the received INAP message is decoded based on the type thereof and a corresponding SCP relationship object is found using the dialogue ID included in the decoded INAP message. When the IC component and IC primitive are contained in the decoded message, the IC primitive is executed first and then the IC component is processed. When a corresponding call has been processed, the found SCP relationship object is deleted, finishing the dialogue with the SCP. Accordingly, various applications in the SSP can freely communicate with the TCAP using the INAP message.

15 Claims, 14 Drawing Sheets

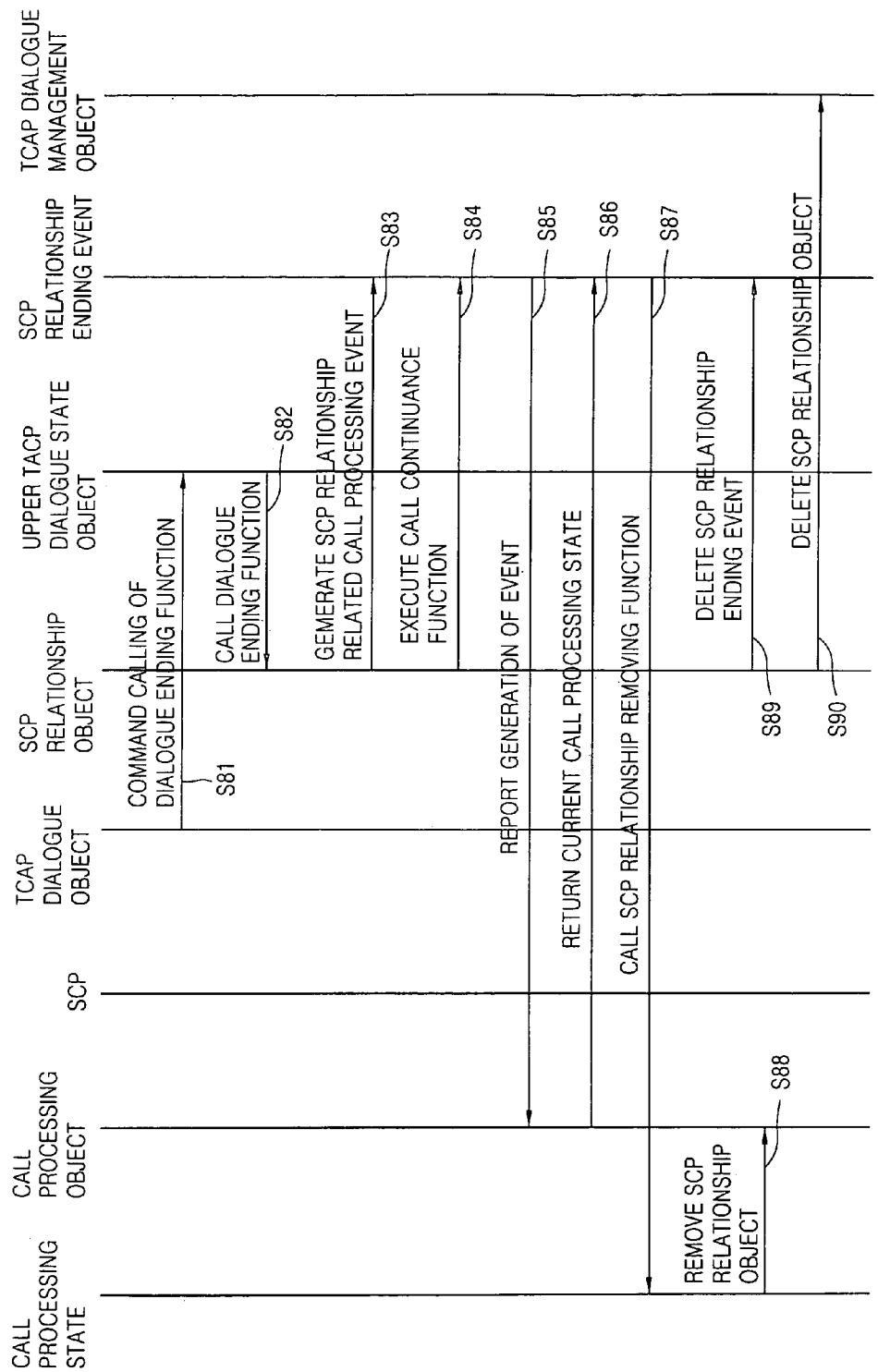

INAP PROCESSING METHOD FOR COMMUNICATION BETWEEN SSP AND TCAP

BACKGROUND OF THE INVENTION

1. Field of the Invention

The present invention relates to an intelligent network (IN) and, more particularly, to a method of processing an intelligent network application protocol (INAP) for communication between a service switching point (SSP) of an intelligent network and a transaction capabilities application part (TCAP).

2. Description of the Related Art

Since 1836, when the telephone was invented, it has been dramatically developed both technically and quantitatively. However, in the middle of 1980 the telephone confronted several changes. First, the number of new telephone subscribers has decreased, second, the consciousness of the subscribers has changed and third, a competitive principle was introduced to the communication market. To correspond to the above changes, service providers have added a computer for controlling a service and database for executing the service on a conventional telephone network, thereby providing various services instantly by using the newly added computer and database in addition to transferring information through the conventional telephone network. Gradually, the above changes were dealt with by an intelligent network (IN) which combines a computer network to the telephone network in a method of No. 7 common channel signaling, and separates into two functions of simply connecting a telephone call and controlling the service hierarchically, thereby creating and controlling new services rapidly and efficiently.

FIG. 1 shows the structure of the initial IN. As shown in FIG. 1, the IN includes a service control point (SCP) which has the communication service controlling logic in the network; a service management system (SMS) for managing data required for providing the service; a service switching point (SSP) for connecting the SCP to the conventional local exchanger; and a No. 7 common channel signaling system. The SCP includes a specific type of electronic switching system or a common computer and the SSP includes the specific type of electronic switching system for connecting to service users. The SSP includes IP, which receives the request signal of specific information and provides the resources. A new protocol for objectifying common functions, which do not depend on certain services and re-performing the common functions is required in the IN for the next generation. Therefore, ITU-T (International Telecommunication Union-Telecommunication standardization section) recommends INAP for interactions among the intelligent network components to satisfy above requirements. The INAP is an application layer protocol for supporting interactions among physical subjects and No. 7 common channel signaling system is mainly used as a lower protocol of the INAP.

FIG. 2 shows the structure of a multi-protocol performed when a service switching point (SSP) and a service control point (SCP) exchange an INAP operation with a TCAP message through the No. 7 common channel signaling system. A message transmit protocol (MTP) is divided into 3 stages of MTP level 1, MTP level 2, MTP level 3. Electrical, physical and functional characteristics are prescribed at the MTP level 1, and at the MTP level 2, error detecting and correcting, error monitoring of order message and signal link is performed in order to transmit a reliable signal message between two signal points. MTP level 3 defines the common transmission function and procedure used for independent operation of an individual signal data link and at the same time manages the signal network for maintaining the normal message processing according to the signal network state. A signaling connection control part (SCCP) takes charge of transmission of signal data and execution of logical signaling connection control in a network together with the MTP. In addition, the TCAP performs a function for providing connectionless intelligent network service among elements of the communication network, and the INAP supports interactions among physical subjects.

However, the ITU-T proposed only general recommendations with respect to the INAP and TCAP that exchange the INAP operation but did not suggest a concrete method for processing messages between the INAP and TCAP.

SUMMARY OF THE INVENTION

It is, therefore, an object of the present invention to provide an INAP processing method which allows applications using the INAP in the SSP to be able to communicate with the TCAP.

Another object of the present invention is to provide an INAP processing method for communication between the SSP and the TCAP, which improves reutilization through object-oriented design and realization of software blocks for processing the INAP in the SSP so that only INAP messages are added, changed and deleted without changing the applications using the software blocks to be applied to a new system and, simultaneously, the maintenance becomes simplified.

To accomplish the objects of the present invention, there is provided a method of processing an INAP for communication between a SSP and TCAP including generating an INAP message object which indicates an INAP initial setting through an INAP factory object; calling a transmission component function using the INAP object as a parameter to obtain an invoke ID and dialogue ID from a TCAP dialogue object, to set them in an INAP message object; issuing a component addition command, to add the INAP object to a TCAP message object; and generating and executing different transmission TCAP events, based on the current TCAP dialogue state, to send the INAP message and delete the object after sending the message.

To accomplish the objects of the present invention, there is provided a method of processing an INAP for communication between a SSP and TCAP including when a TC primitive is received from the TCAP, generating a TC beginning object for processing the received TC primitive; executing the TC beginning object to find a corresponding SCP relationship object using a dialogue ID included in the received TC primitive; instructing to add the new TC beginning object to a TCAP message by using the SCP relationship object; executing the TC primitive to which the TC beginning object was added; and performing a corresponding call processing, and then deleting the SCP relationship object to finish a dialogue with the SCP.

To accomplish the objects of the present invention, there is also provided a method of processing an INAP for communication between a SSP and TCAP including the SSP generating a TC component to be sent to a SCP; allocating an invoke ID and dialogue ID to the generated TC component; generating a TC primitive corresponding to the state of the allocated dialogue; sequentially encoding the generated TC component and TC primitive in formats suitable for the protocol, to send it to the TCAP through a TCAP interface block; receiving an INAP message sent from the TCAP; decoding the received INAP message based on its kind; finding a corresponding SCP relationship object using the dialogue ID contained in the decoded INAP message; when the TC primitive is included in the decoded INAP message, executing the TC primitive; and upon execution of corresponding call processing, deleting the found SCP relationship object, to finish a dialogue with the SCP.

BRIEF DESCRIPTION OF THE DRAWINGS

FIG. 1 shows the structure of an initial IN;

FIG. 16 shows a procedure of finishing the dialogue with the SCP of FIG. 14.

DETAILED DESCRIPTION OF THE PREFERRED EMBODIMENT

Reference will now be made in detail to the preferred embodiments of the present invention, examples of which are illustrated in the accompanying drawings.

Figure 3:
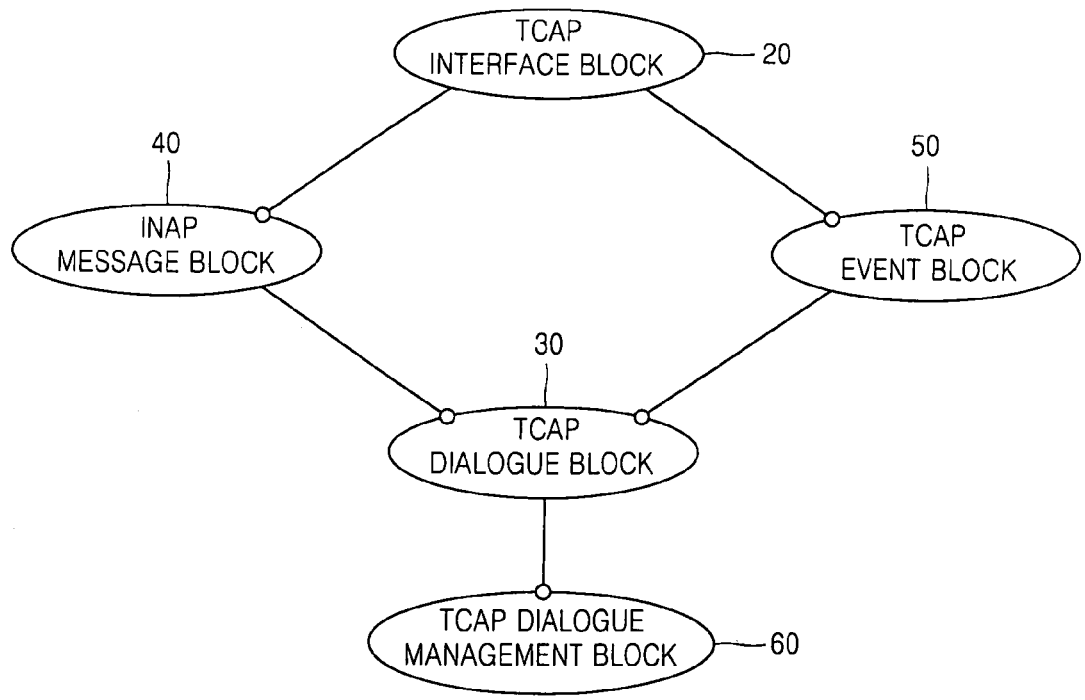
FIG. 3 shows blocks of software constructing the INAP of a SSP to which the present invention is applied.

In an intelligent network, the SSP uses multiple protocols of INAP, TCAP, SCCP and MTP when it communicates with the SCP. FIG. 3 shows blocks of software constructing the INAP of the SSP to which the present invention is applied. Referring to FIG. 3, the INAP includes a TCAP interface block being interfaced with the TCAP that is a lower protocol component of the INAP to transmit/receive an INAP message, an INAP message block 40 for processing the INAP message transmitted/received, a TCAP dialogue block 30 for managing a dialogue serving as a communication channel between the SSP and SCP by dialogue statuses, a TCAP event block 50 for managing TCAP dialogue events created together with the INAP message transmitted/received, and a TCAP dialogue management block 60 for, when the TCAP and INAP communicate with each other in dialogues, generating and managing a dialogue ID for classifying each dialogue.

The TCAP interface block 20 includes a single TCAP interface object. The dialogue means a logical communication path required for communication between the SSP and SCP using the INAP and TCAP. This dialogue includes an unstructured dialogue and structured dialogue. The unstructured dialogue is used when transmitting unidirectional messages requiring no response from a counterpart (reception node) for a dialogue that was transmitted to the counterpart. The structured dialogue is used when transmitting bidirectional messages requiring a response from the counterpart for the dialogue that was transmitted to the counterpart. The response from the counterpart is received to form the structured dialogue between transmission and reception nodes. This dialogue sequentially passes through procedures of start, continuance and end. For the structured dialogue, multiple dialogues can be processed simultaneously. Here, each dialogue is classified by a dialogue ID.

Each of the TCAP dialogue block 30, INAP message block 40, TCAP event block 50 and TCAP dialogue management block 60 further includes a plurality of objects, and they are connected and operate together through these objects to process INAP messages related to the dialogue. The configuration of each software block constructing the INAP of the SSP will be described below.

Figure 1:
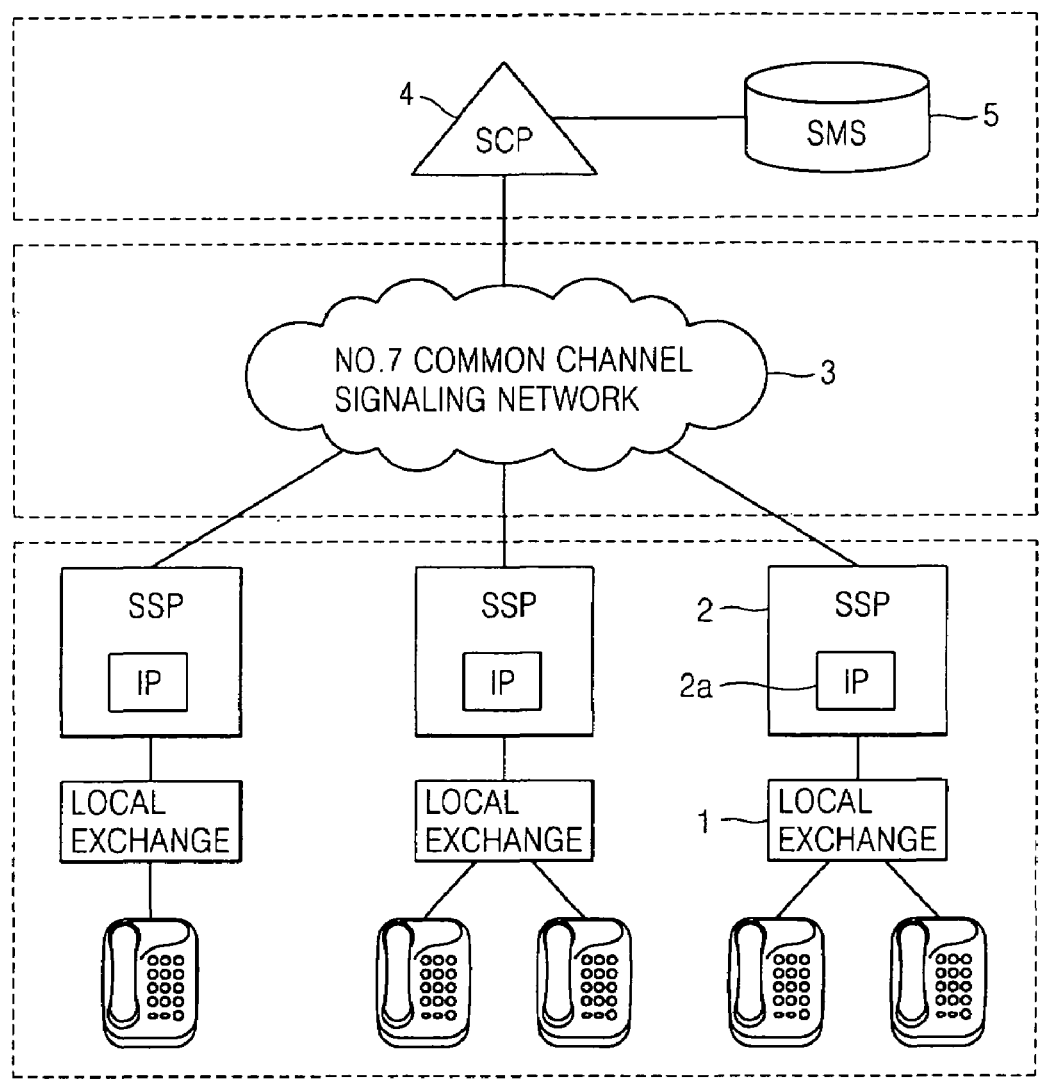
Figure 2:
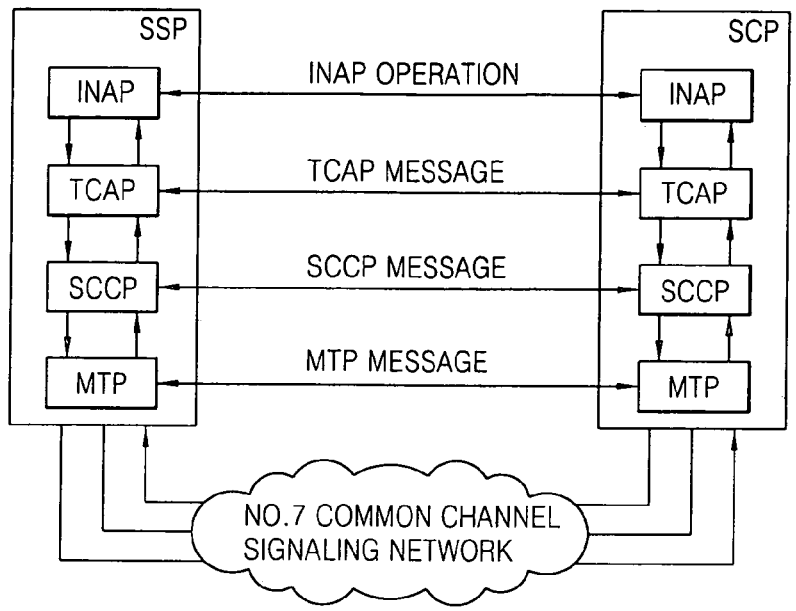
FIG. 2 shows the structure of a multi-protocol performed when a service switching point (SSP) and a service control point (SCP) exchange an INAP operation with a TCAP message through the No. 7 common channel signaling system.
Figure 4:
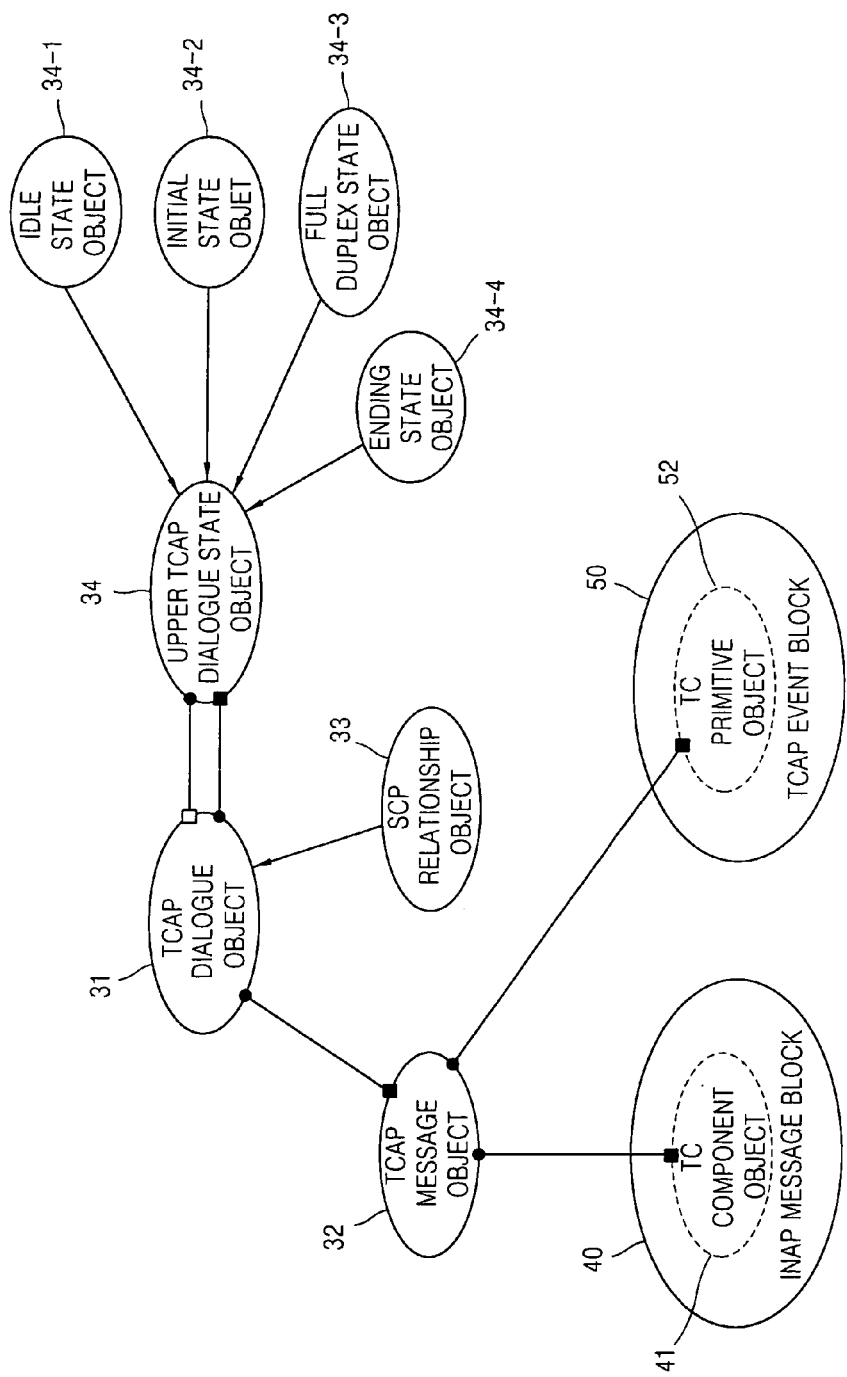
FIG. 4 shows the TCAP dialogue block of FIG. 3 in detail.

First of all, as shown in FIG. 4, the TCAP dialogue block 30 includes a TCAP dialogue object 31, a TCAP message object 32, a SCP relationship object 33 and a TCAP dialogue stage base object 34. The TCAP dialogue object 31 has information about the current dialogue state through the TCAP dialogue stage base object 34 and serves as the base object of the SCP relationship object 33. The TCAP message object 32 operates together with a TC component object 41 of the INAP message block 40 to store and transmit INAP messages to be transmitted/received to/from the TCAP. As shown in FIG. 1 and Table 1, messages forming the INAP messages include a TC component object 41 and TC primitive object 52.

TABLE 1

| TC primitive | TC component 1 | TC component 2 | ... |
|---|---|---|---|

Figure 7:
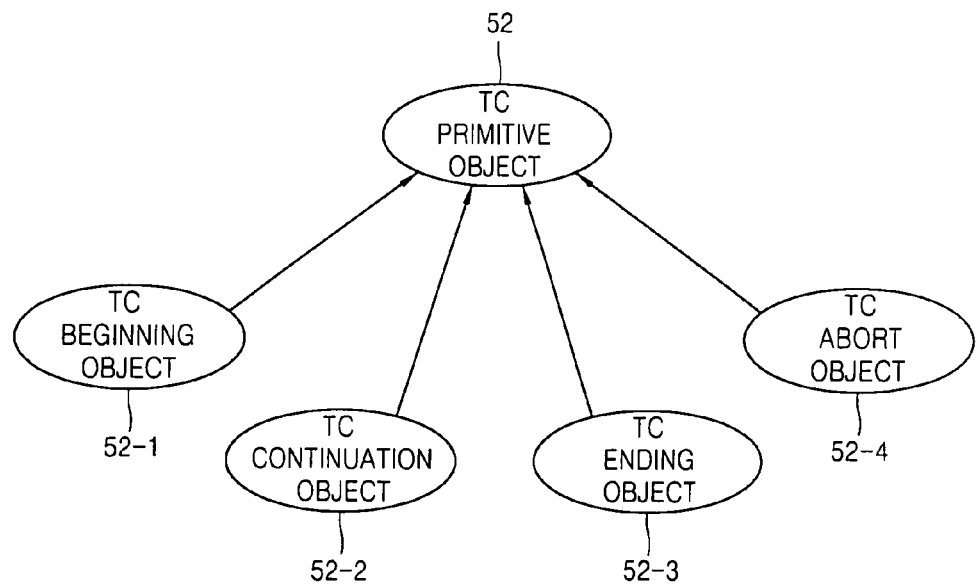
FIG. 7 shows the TC primitive object of FIG. 6 in detail.

The TC primitive object 52 includes, as shown in FIG. 7, TC begin object 52-1, TC continue object 52-2, TC end object 52-3 and TC abort object 52-4.

Figure 5:
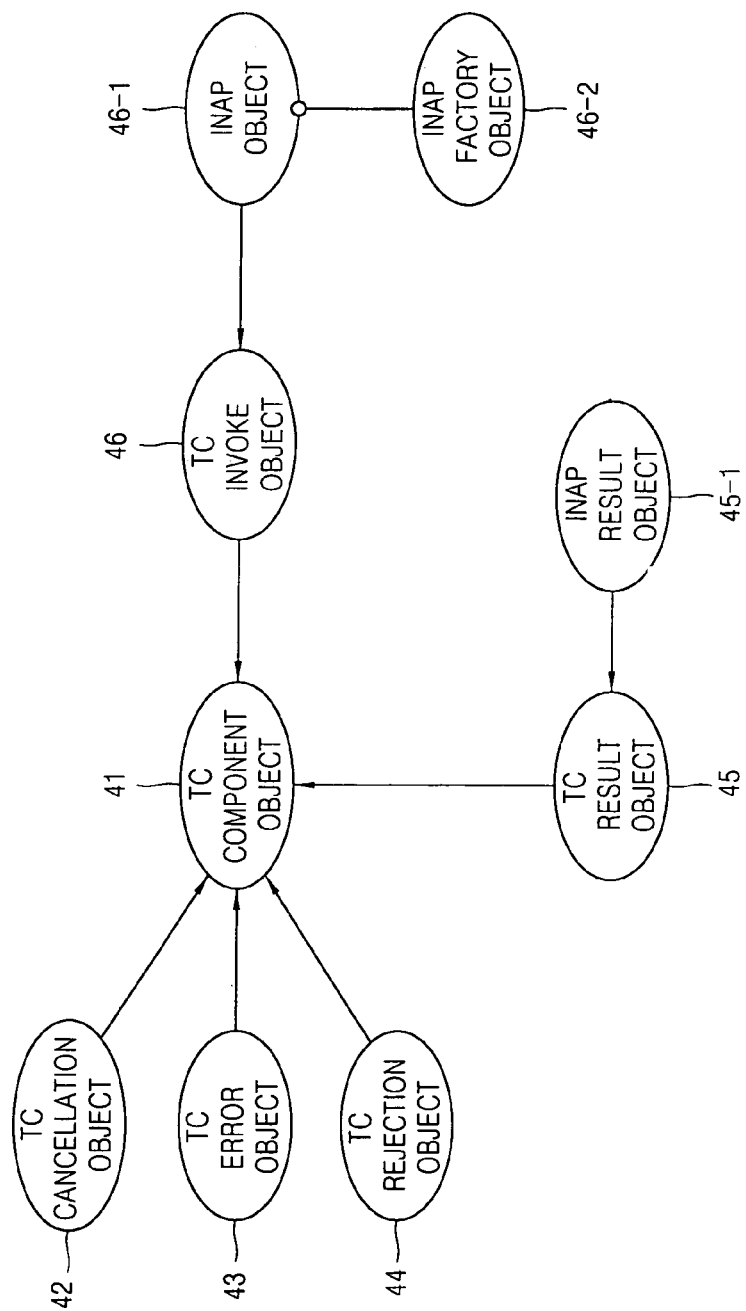
FIG. 5 shows the INAP message block of FIG. 3 in detail.

The TC component object 41 includes, as shown in FIG. 5, TC cancel object 42, TC reject object 44, TC error object 43, TC result object 45 and TC invoke object 46.

The SCP relationship object 33 is newly generated whenever it starts communication with the SCP to indicate the relationship with the SCP. The object 33 has network address values for the SCP that physically exists, as a communication path for the SCP. The SCP relationship object 33 inherits the attribute from the TCAP dialogue object 31. The TCAP dialogue stage base object 34 is an upper class of TCAP dialogue state objects indicating the state of dialogue and has a common attribute of the TCAP dialogue stage objects. The TCAP dialogue state objects, that is, an idle state object 34-1, an initiate state object 34-2, a fill duplex state object 34-3 and an end state object 34-4, inherits the attribute from the TCAP dialogue stage base object 34.

The idle state object 34-1 indicates the state when the TCAP dialogue is initially created. In this state, it can send a TC primitive called TC begin that means initiation of a dialogue. The initiate state object 34-2 represents a state changed when the TC begin is transmitted in the idle state.

The full duplex state object 34-3 indicates a state converted when a TC continue was received from a counterpart after the transmission of TC begin or the TC begin was initially accepted from the counterpart. The end state object 34-4 indicates a state where a TC primitive that requests completion of dialogue such as TC end or TC abort is received or a proceeding call is finished.

Referring to FIGS. 4 and 5, the INAP message block 40 includes plural objects connected in a hierarchy structure in which the TC component 41 exists in the highest layer and the TC cancel object 42, the TC reject object 44, the TC error object 43, the TC result object 45 and the TC invoke object 46 inherit the attribute of the TC component 41. The TC cancel object 42 is used when a previously transmitted INAP message is cancelled and the TC error object 43 is used when processing of the INAP message failed. The TC reject object 44 is used when the INAP message is rejected because of a problem caused therein, the TC result object 45 is used when the result of normal processing of the INAP message is transmitted/received, and the TC invoke object 46 is used for executing a predetermined operation through the INAP message.

Furthermore, an INAP result object 45-1 inherits the attribute of the TC result object 45 and plural INAP result objects can be made according to an individual INAP result declared as a template to be used. For example, if there is a received information result and a request current status report result as results capable of being transmitted to the TC result object 45, the INAP result object 45-1 declared as a template for each result is created, the TC result object 45 serving as the base of the INAP result object 45-1 is generated, and then the TC component object 41 that is the base of the TC result object 45 is created. Accordingly, the INAP message can be transmitted using the TC component object 41 generated as above and different kinds of TC result objects can be created.

The TC invoke object 46 is generated when an operation is executed through the INAP message. An INAP object 46-1 inherits the attribute of the TC invoke object 46. Various kinds of INAP objects can be created according to individual INAP operation types used as templates. For instance, when an initial detection point INAP operation type is used as a template of the INAP object 46-1, the INAP object 46-1 declared as the template is generated by an INAP factory object 46-2, and then the INAP object 46-1 is created. Thereafter, the TC invoke object 46 serving as the base of the INAP object 46-1 is generated, and then the TC component object 41 that is the base of the TC invoke object 46 is made. The INAP message is generated using the TC component object 41 created as above. In this manner, various kinds of INAP objects that are represented by the TC invoke object 46 can be made.

Figure 6:
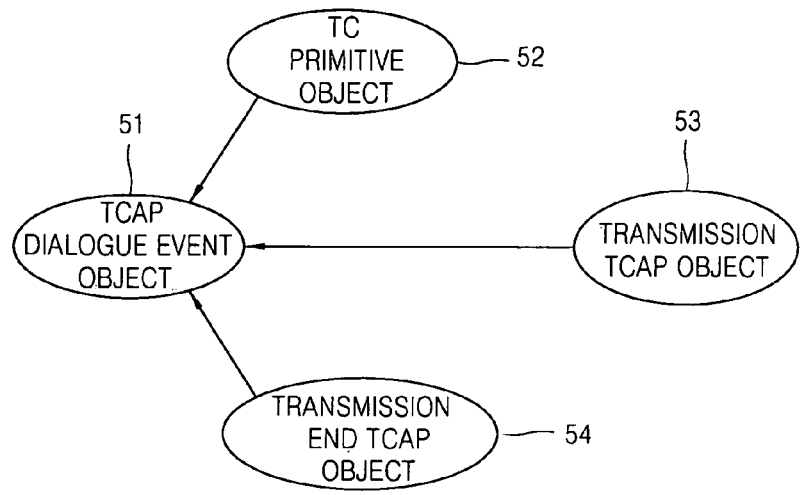
FIG. 6 shows the TCAP event block of FIG. 3 in detail.

Referring to FIG. 6, the TCAP event block 50 shown in FIG. 4 includes a TCAP dialogue event object 51, a TC primitive object 52, a transmission TCAP object 53, and a transmission end TCAP object 54. These objects inherit the attribute of the TCAP dialogue event object 51. The TCAP dialogue event object 51 serving as the base of the TCAP dialogue event has a common attribute of the TCAP dialogue event. The TC primitive object 52 processes TC primitive events generated when the INAP message is received from the TCAP. In other words, it generates objects indicating characteristics of the dialogue with the TCAP, that is, TC begin, TC continue, TC end and TC abort.

The INAP message includes both of the TC primitive and TC component or it includes only the TC primitive. Accordingly, the TC primitive event is generated all the time when the INAP message is received from the TCAP. This TC primitive indicates a common attribute of the dialogue characteristics and the TC component represents operations (command processed result, operation rejection, operation cancellation, error, etc., for example) that must be processed when the INAP message is received from the counterpart.

Referring to FIG. 7, the TC primitive object 52 includes a TC begin object 52-1 generated when a dialogue with the TCAP begins, a TC continuation object 52-2 created when a response to the TC begin object is sent, a TC end object 52-3 generated when the dialogue is finished and a TC abort object 52-4 created when the dialogue is forcibly ended due to generation of error in the message or on the network.

The transmission TCAP object 53 in FIG. 6 is an event object that is generated when the INAP message (TC primitive and TC component) is sent and it maintains or changes the state of dialogue according to a current dialogue state. The transmission end TCAP object 54 is created when the current dialogue is finished after transmission of the INAP message. Here, the TC primitive of the INAP message transmitted becomes the TC end object 52-3.

Figure 8:
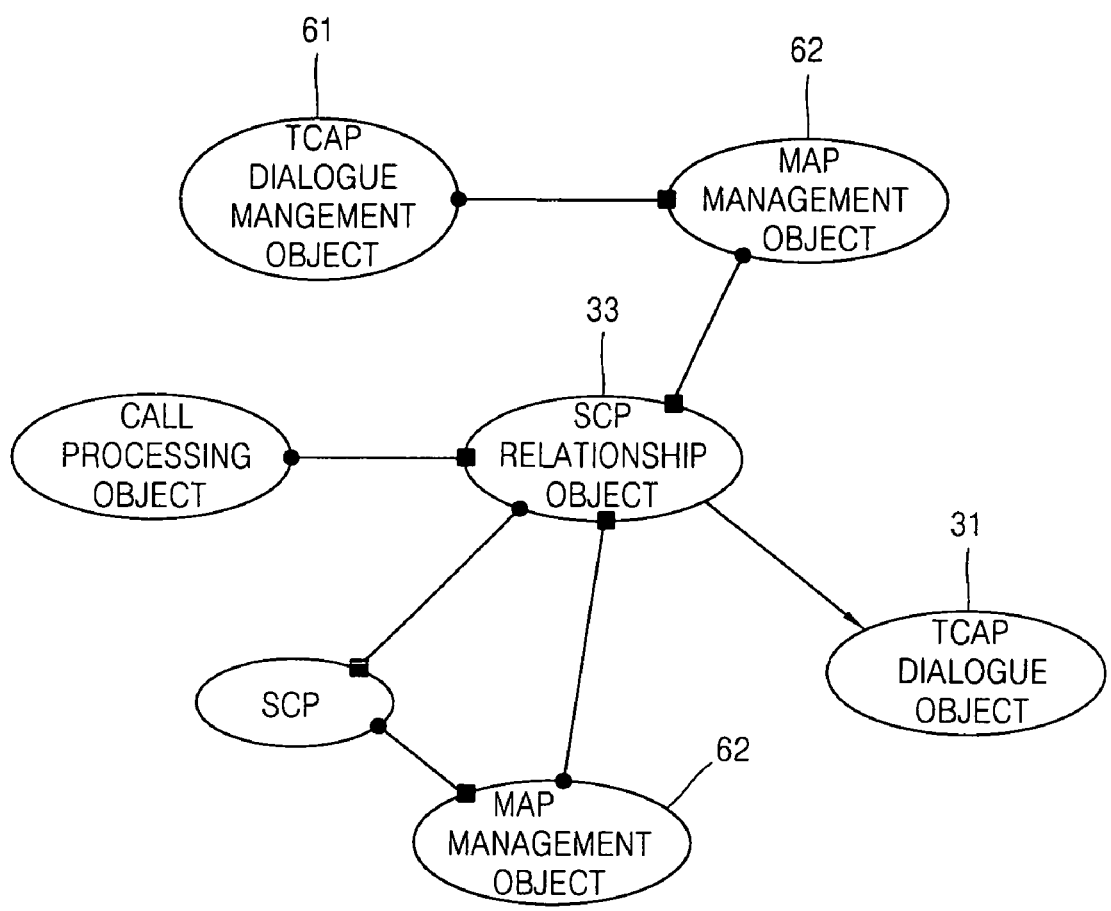
FIG. 8 shows the TCAP dialogue management block of FIG. 3 in detail.

Referring to FIG. 8, the TCAP dialogue management block 60 shown in FIG. 3 includes a TCAP dialogue management object 61 generating dialogue IDs used when the INAP and TCAP communicate with each other and the SCP relationship object with respect to the dialogue IDs, and a map management object 62 for storing and managing information about the SCP relationship object 33 with respect to the dialogue IDs.

The operation of an INAP processing apparatus for communication between the SSP and TCAP according to the present invention will be explained in detail with reference to the attached drawings.

(A) Transmission of INAP Messages

First, the INAP message includes, as shown in Table 2, a field in which an invoke ID and dialogue ID are given and a field in which the INAP factory is given.

TABLE 2

| Invoke ID | INAP factory |
| --- | --- |
| Dialogue | |

The INAP factory includes an initial DP and connecter.

Figure 9:
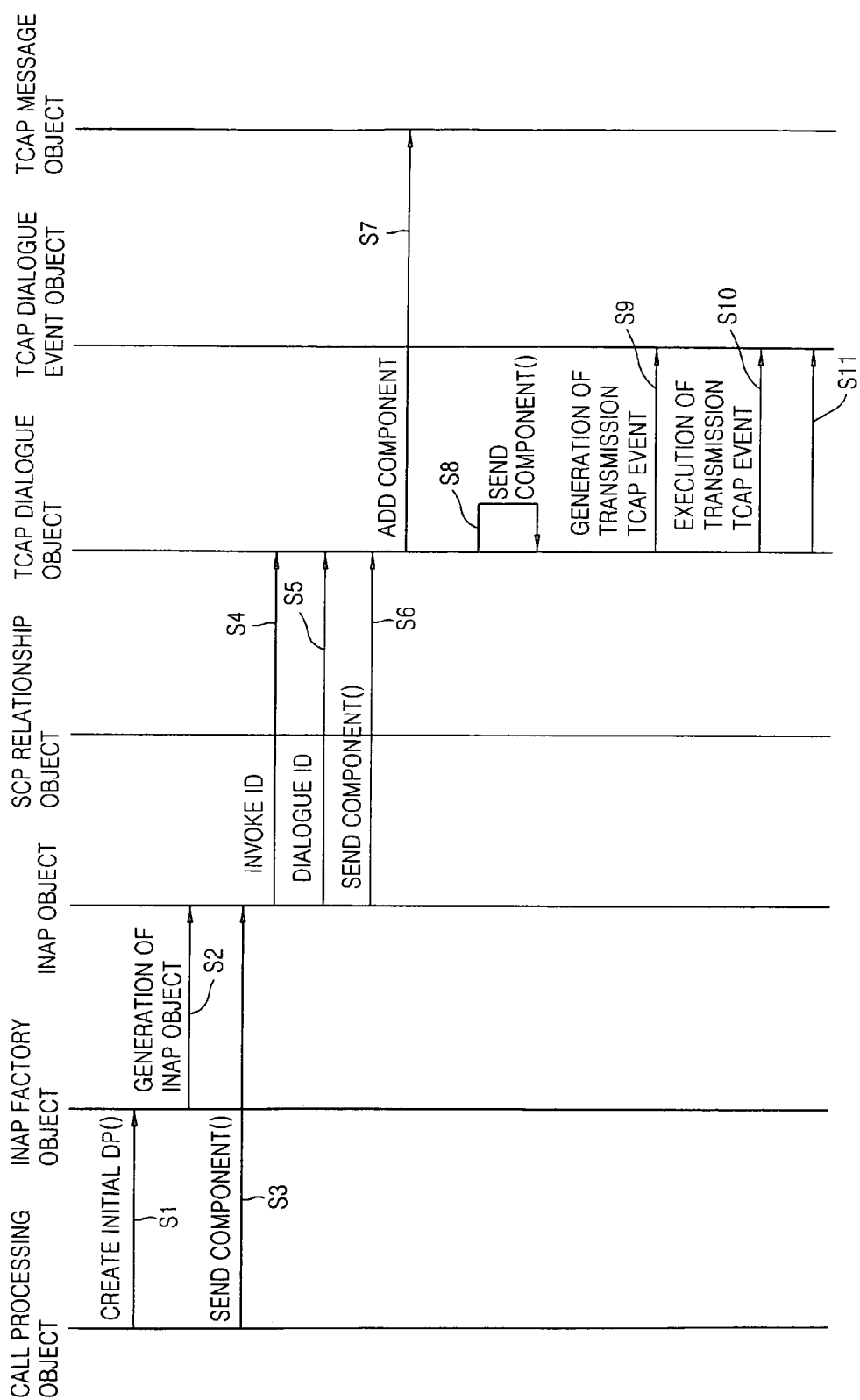
FIG. 9 shows a method of transmitting INAP messages according to an INAP processing apparatus of the invention.

When an INAP message is sent from the INAP of the SSP to the TCAP, a TC component to be transmitted is generated, the invoke ID and dialogue ID are allocated to the generated TC component, a TC primitive corresponding to the state of an allocated dialogue is created and encoded, to be sent to the TCAP through the TCAP interface block. This is described below in more detail with respect to FIG. 9.

A call processing object that is an application using the INAP generates the INAP object 46-1 related with the INAP initial detection point INAP_initialDP through the INAP factory object 46-2. For this, the INAP factory object 46-2 calls an initial detection point creation function createInitialDP( ) among a plurality of INAP object related functions based on the kinds of templates the INAP factory object has (S1), to generate the INAP object 46-1 related with the INAP initial detection point through an INAP object creating procedure using 'NEW' operator in C++ programming (S2).

Figure 10:
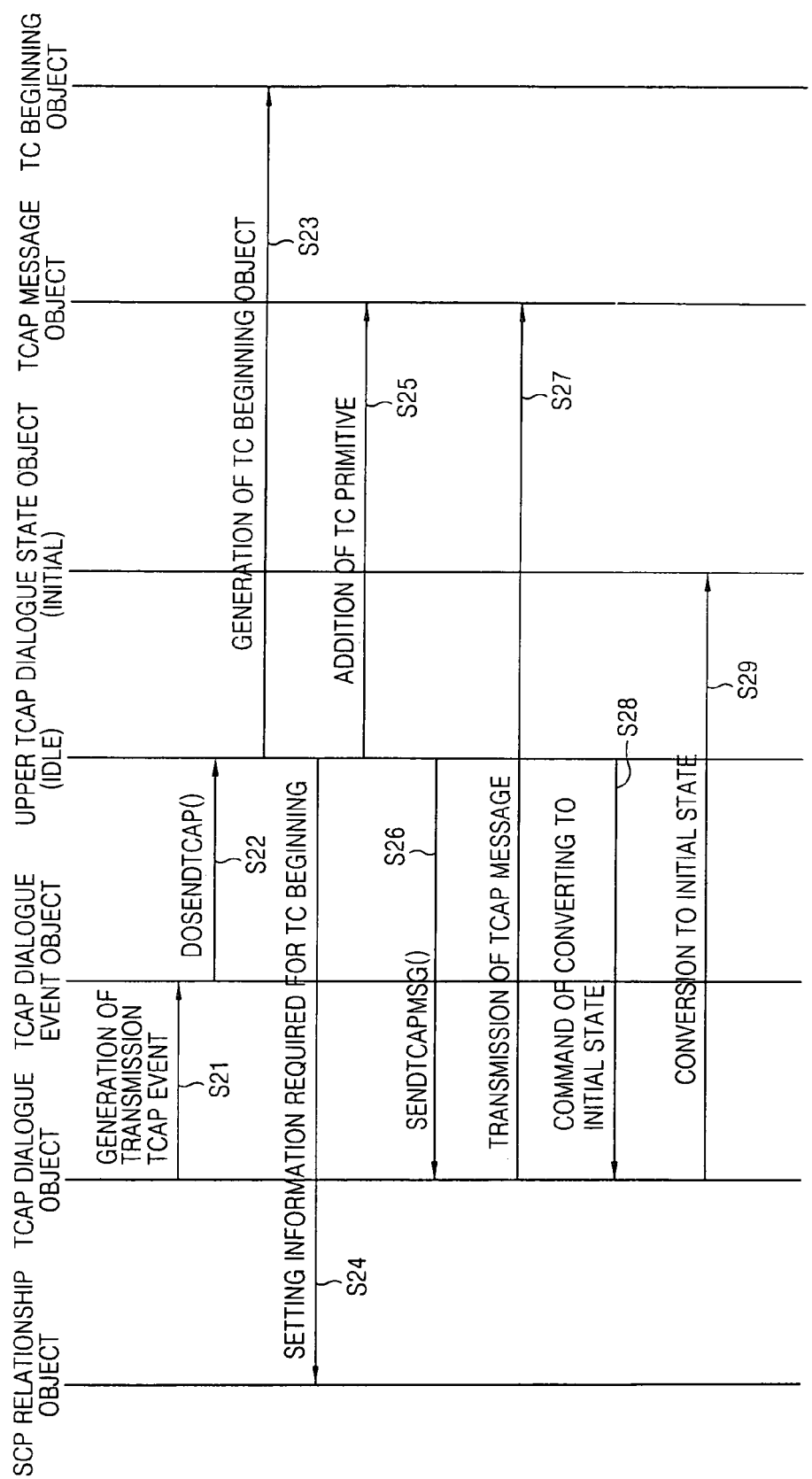
FIG. 10 shows a method of executing the transmission TCAP event of FIG. 9.

Then, the call processing object obtains the invoke ID and dialogue ID from the TCAP dialogue objects to set them in the INAP message to send the generated INAP object 46-1 to the TCAP (S4 and S5). Here, since the INAP message is sent through the TCAP dialogue object 31, the INAP object 46-1 of the INAP message block 40 calls a transmission component function of the TCAP dialogue object 31 using the INAP object itself as a parameter (S6). The TCAP dialogue object 31 gives a component command to the TCAP message object 32 included therein, to add the INAP object 46-1 to the TCAP message object 32 (S7). The TCAP dialogue object 31 calls the transmission component function to send the INAP object 46-1 added to the TCAP message object 32 (S8), to generate a transmission TCAP event that is a TCAP dialogue event (S9). In addition, it executes the transmission TCAP event to send the INAP message (S10), and then performs deletion (S11). The procedure (S10) of executing the transmission TCAP event is explained below in more detail with reference to FIG. 10.

The TCAP dialogue event object 51 executes different events based on the current TCAP dialogue state. The transmission TCAP event that is the TCAP dialogue event is generated in the idle state according to the upper TCAP dialogue stage object 34 (S21) and a transmission TCAP function doSendTCAP( ) corresponding thereto is called by the upper TCAP dialogue stage object 34 (S22). Here, the INAP object 46-1 is inherited from the TC component object 41, and the TC begin object 52-1 is created through the TC primitive object 52 (S23) because the TC component must be sent together with the TC primitive. That is, the transmission TCAP event generates the TC primitive object 52 indicating TC beginning in the idle state.

Thereafter, the upper TCAP dialogue state object 34 obtains information (a network address of the SCP, etc.) required for TC beginning from the SCP relationship object 33 and sends this information to the SCP (S24) to issue a TC primitive addition command, thereby adding the TC primitive to the TCAP message to which the TC component was added previously (S25). The upper TCAP dialogue state object 34 calls a TCAP message sending function sendTCAPmsg( ) from the TCAP dialogue object 31 to send the TCAP message to which the TC component and TC primitive was added (S26), and the TCAP dialogue object 31 transmits the TCAP message, that is, the TC component and TC primitive, in the idle state (S27).

Figure 11:
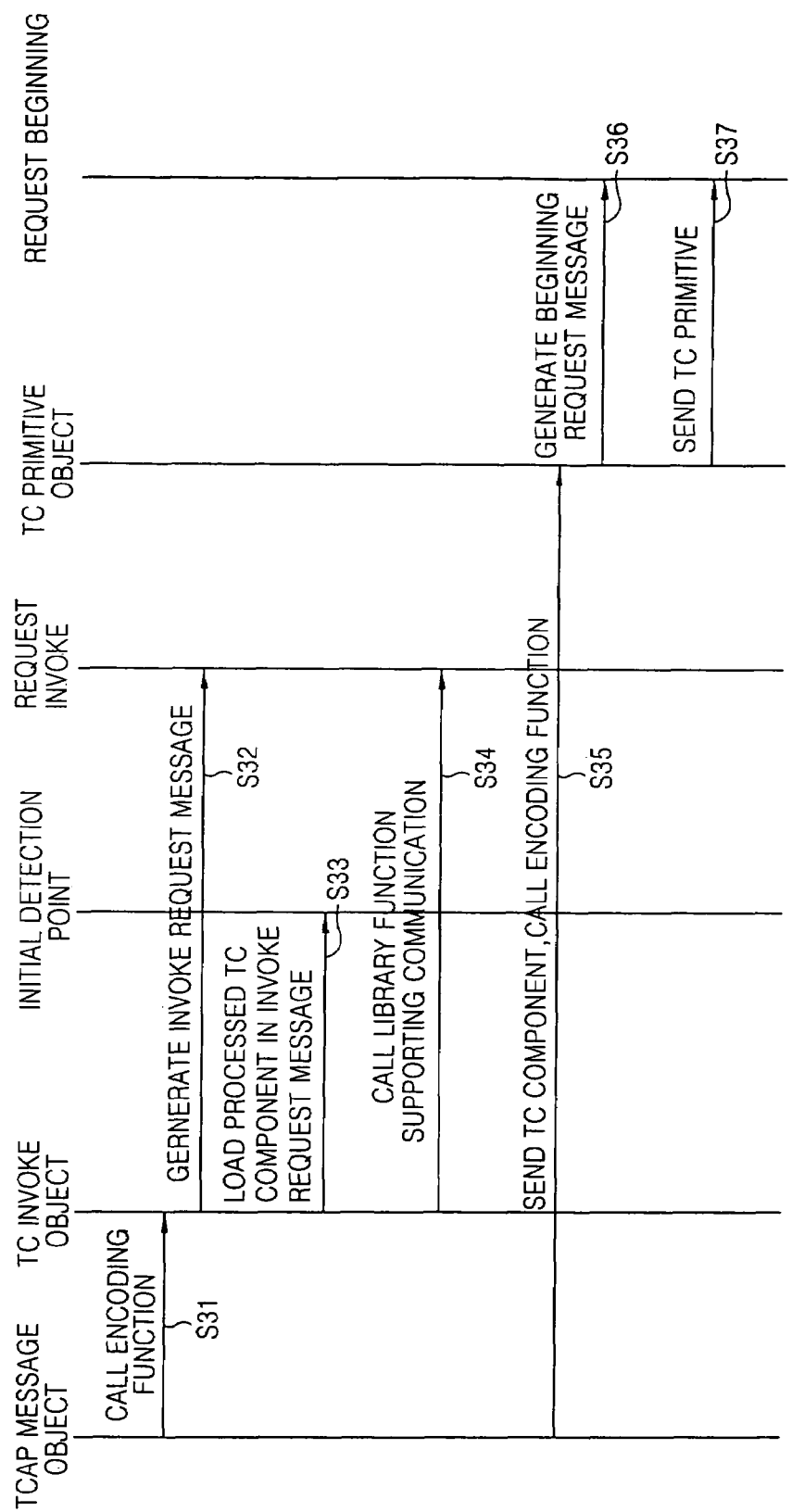
FIG. 11 shows a method of transmitting the TCAP messages of FIG. 10.

Accordingly, the upper TCAP dialogue state object 34 gives a command of changing into the initial state to the TCAP dialogue object 31 (S28), thereby transferring the TCAP dialogue object 31 currently being in the idle state into the initial state (S29). Furthermore, the procedure (S27) of sending the TCAP message is performed in a manner that the TC component is sent first and then the TC primitive is delivered, which will be described in more detail with reference to FIG. 11.

When the TCAP message object 32 calls an encoding function from the TC invoke object 46 (S31) to process the TC component into a format capable of being used in the TCAP and its lower network protocol, the TC invoke object 46 generates an invoke request message to be actually sent to the TCAP (S32) and then loads the processed TC component in a data region of the invoke request message (S33). Thereafter, the TC invoke object 46 calls a library function supporting communication with the TCAP (S34) to send the TC component of the TCAP message to the TCAP.

After transmission of the TC component to the TCAP, the TCAP message object 32 calls an encoding function from the TC primitive object 52 to send the TC primitive (S35). The TC primitive object 52 moves to a TC beginning state in which it processes the TC primitive into a format capable of being used in the TCAP and its lower network protocol. Then, the TC primitive object 52 generates a beginning request message to be actually sent to the TCAP (S36), loads the processed TC primitive in a data region of the beginning request message, and calls the library function supporting communication with the TCAP to send the TC primitive of the TCAP message to the TCAP (S37).

(B) Reception of INAP Messages

When the INAP of a SSP receives an INAP message from the TCAP, the received INAP message is decoded based on the type thereof and a corresponding SCP relationship object is found using the dialogue ID included in the decoded INAP message. When the TC component and TC primitive are contained in the decoded message, the TC primitive is executed first and then the TC component is processed. When a corresponding call has been processed, the found SCP relationship object is deleted, finishing the dialogue with the SCP. This will be described in more detail.

Figure 12:
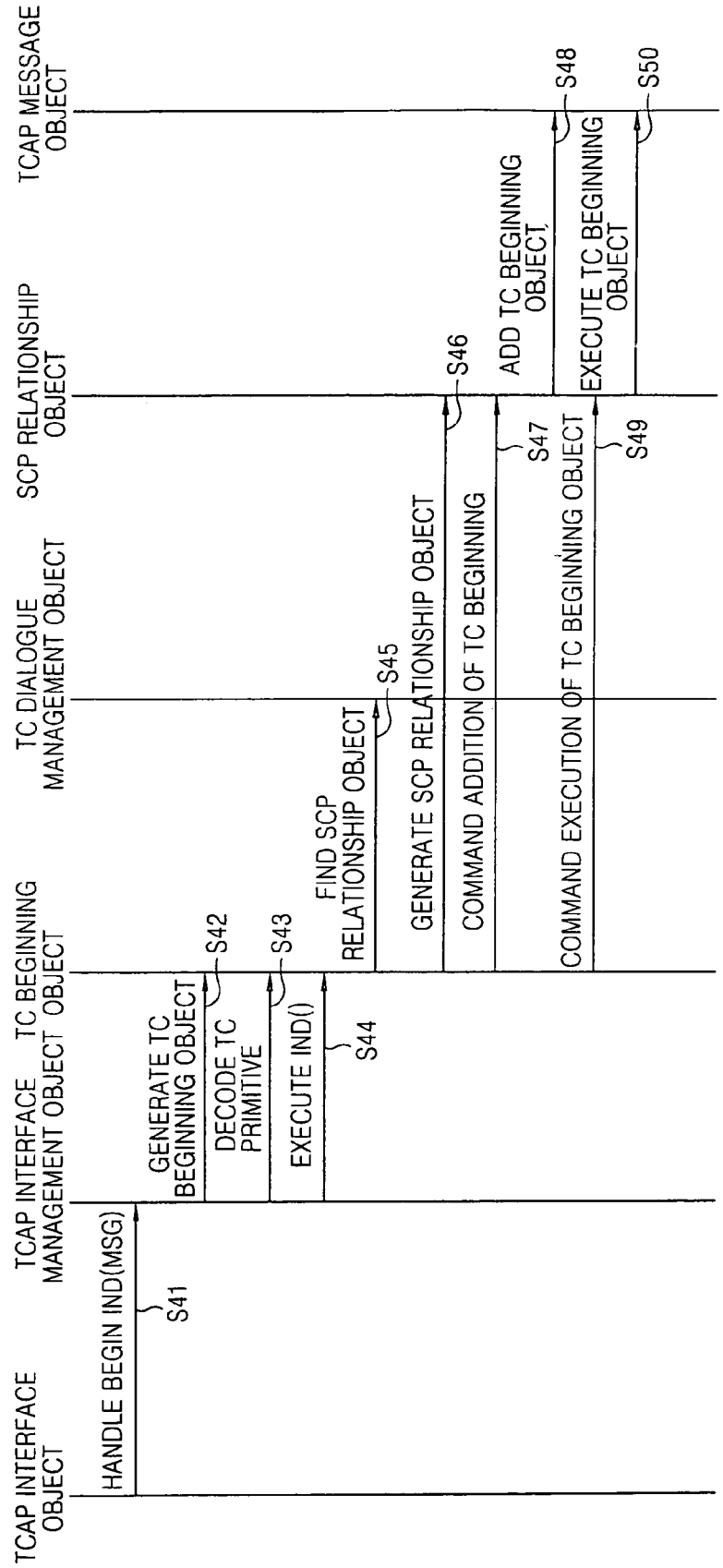
FIG. 12 shows a method of receiving INAP messages according to the INAP processing apparatus of the invention.

Referring to FIG. 12, the INAP message such as the TC component, TC primitive and other state related messages of a lower network used by the INAP is received from the TCAP through the TCAP interface object. The received INAP message is distributed to applications using the same. Here, the INAP message is received in such a manner that the stage of the TCAP dialogue object is changed or maintained while the TC primitive is processed first and then the TC component is processed.

When the TCAP interface object has accepted the TC primitive that indicates TC beginning from the TCAP, a TCAP interface management object (not shown) managing the TCAP interface object calls a beginning related message handling function handleBeginIND(msg) (S41) to generate a new TC beginning object 52-1 through the TC primitive object 52 to process the TC primitive (S42). Here, the TC primitive received by the TC beginning object 52-1 is decoded (S43) to create the same TC beginning object 52-1 as the TC beginning object included in the TC primitive.

The TCAP interface management object calls an execution function executeIND( )(S44) to execute the generated TC beginning object 52-1. The TC beginning object 52-1 finds the corresponding SCP relationship object 33 through the TCAP dialogue management object 61 using the dialogue ID contained in the received TC primitive (S45). When the dialogue ID was not found, a new SCP relationship object 33 is created through the TCAP dialogue management object 61 (S46). That is, the TC primitive object 52 that inherits the TC beginning object 52-1 instructs the TCAP dialogue management object 61 to find the SCP relationship object 33 using the dialogue ID or when the dialogue ID was not found, commands the TCAP dialogue management object 61 to generate the new SCP relationship object. Accordingly, the TCAP dialogue management object 61 finds the SCP relationship object 33 corresponding to the dialogue ID or creates the new SCP relationship object, thereby managing the TCAP dialogue and TCAP dialogue's state through the SCP relationship object 33.

Figure 13:
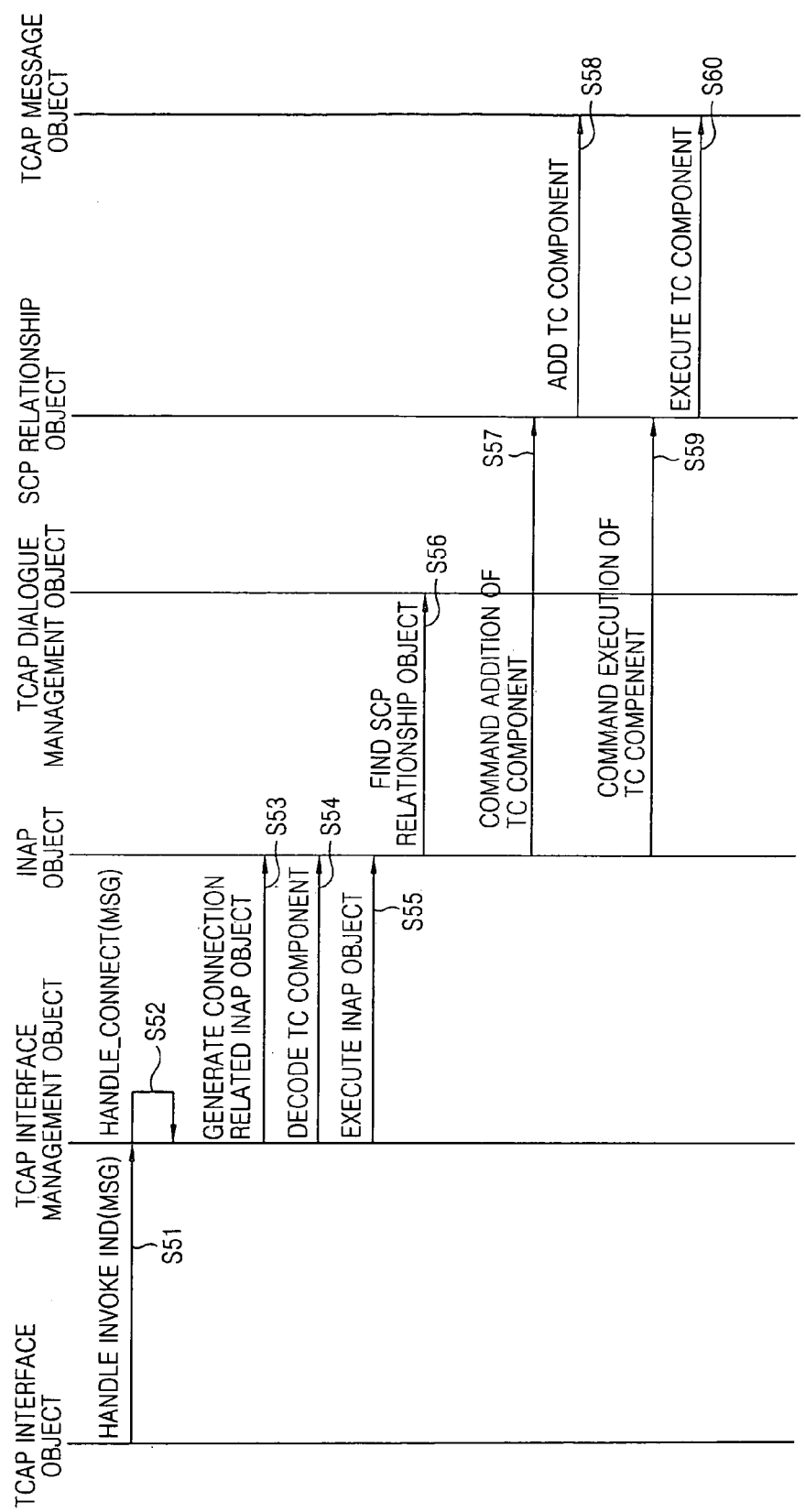
FIG. 13 shows a procedure of processing the TC component of FIG. 12.

When the TC primitive object 52 commands the SCP relationship object 33 to add the TC beginning object, the SCP relationship object 33 adds the TC beginning object 52-1 to the TCAP message (S47 and S48). Subsequently, the TC primitive object 52 executes the TC beginning object 52-1 added through the SCP relationship object 33 (S49 and S50). Here, the TC beginning object 52-1 can be executed only when the TC primitive was received without accompanying the TC component. If the TC primitive and TC component are accepted together, after the TC component is processed while the execution of the TC beginning object 52-1 that is the TC primitive is being withheld, the TC beginning object 52-1 is carried out and then the TC component is executed. The TC component processing is described below according to a procedure of processing the TC invoke object 46 of the TC component shown in FIG. 13.

Upon reception of the TC invoke object 46 of the TC component from the TCAP through the TCAP interface object, the TCAP interface management object managing the TCAP interface object calls an invoke related message handling function handleInvokeIND(msg) (S51), to process the received TC invoke object 46. The TC invoke object 46 has various kinds of INAP objects so that an operation code loaded on the TC invoke object 46 must be analyzed to process it. When it is confirmed that the operation code has a relation with the INAP connection, a connection handling function handle_Connect(msg) is called to be executed (S52). For this, the TCAP interface management object newly generates a connection related INAP object 46-1 using a "NEW" operator in C++ programming (S53), and then decodes the TC component received by the corresponding INAP object 46-1 (S54) to create the same connection related INAP object as the transmitted INAP object.

Moreover, the TCAP interface management object calls an execution function to execute the INAP object 46-1 (S55). The INAP object 46-1 finds a corresponding SCP relationship object 33 through the TCAP dialogue management object 61 using the dialogue ID included in the received TC component (S56). Thereafter, when the INAP object 46-1 commands the SCP relationship object 33 to add the TC component to the TCAP message, the SCP relationship object 33 carries out the command (S57 and S58). Subsequently, the INAP object 46-1 executes the TC component object 41 added through the SCP relationship object 33 (S59 and S60). Here, the execution of TC component can be carried out only when the TC component is the last one.

The TCAP message, that is, the TC beginning object 52-1 of the TC primitive and the TC invoke object 46 of the TC component are received, processed and then respectively executed through the aforementioned procedure. Here, the TC primitive is executed first and then the TC component is processed. This is described below in more detail with reference to FIG. 14.

Figure 14:
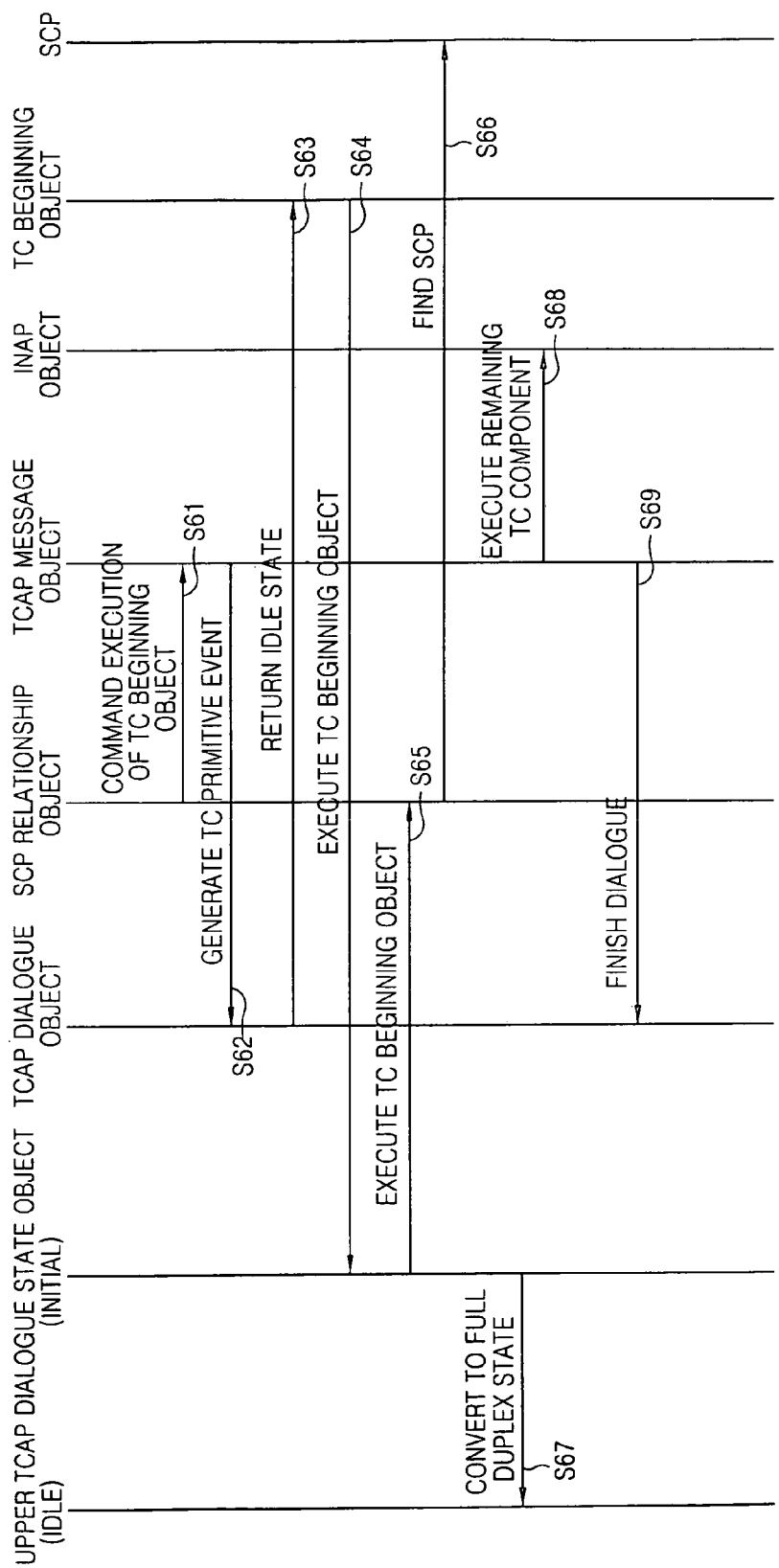
FIG. 14 shows a procedure of executing the TC primitive of the TCAP messages of FIG. 13.

FIG. 14 shows the procedure of executing the TC primitive of the TCAP message. The TC primitive begins when the SCP relationship object 33 instructs the TCAP message object 32 to execute the TC beginning object 52-1 (S61). Then, the TC message object generates a TC primitive event indicating the TC beginning through the TCAP dialogue object (S62). The upper TCAP dialogue state object 34 returns the current TCAP dialogue state, that is, idle state to the TC primitive object 52 (S63). Then, the TC primitive object 52 executes the TC beginning object 52-1 that is the TC primitive object 52 suitable for the TC beginning event in the idle state (S64 and S65). Here, the upper TCAP dialogue state object 34 finds a corresponding SCP using address information of the TC beginning object 52-1 through the SCP relationship object 33 while executing the TC beginning object 52-1 in the idle state (S66), and then transfers the TCAP dialogue to the full duplex state (S67).

Meanwhile, when the TC component is also contained in the TCAP message, the TCAP message object 32 calls a component execution function to carry out the remaining TC component (S68), and confirms the current TCAP dialogue state while executing the TC primitive and TC component. If the current TCAP dialogue state is the end state, a dialogue ending function is executed to finish the TCAP dialogue object 31, thereby ending the dialogue with the SCP (S69).

Figure 15:
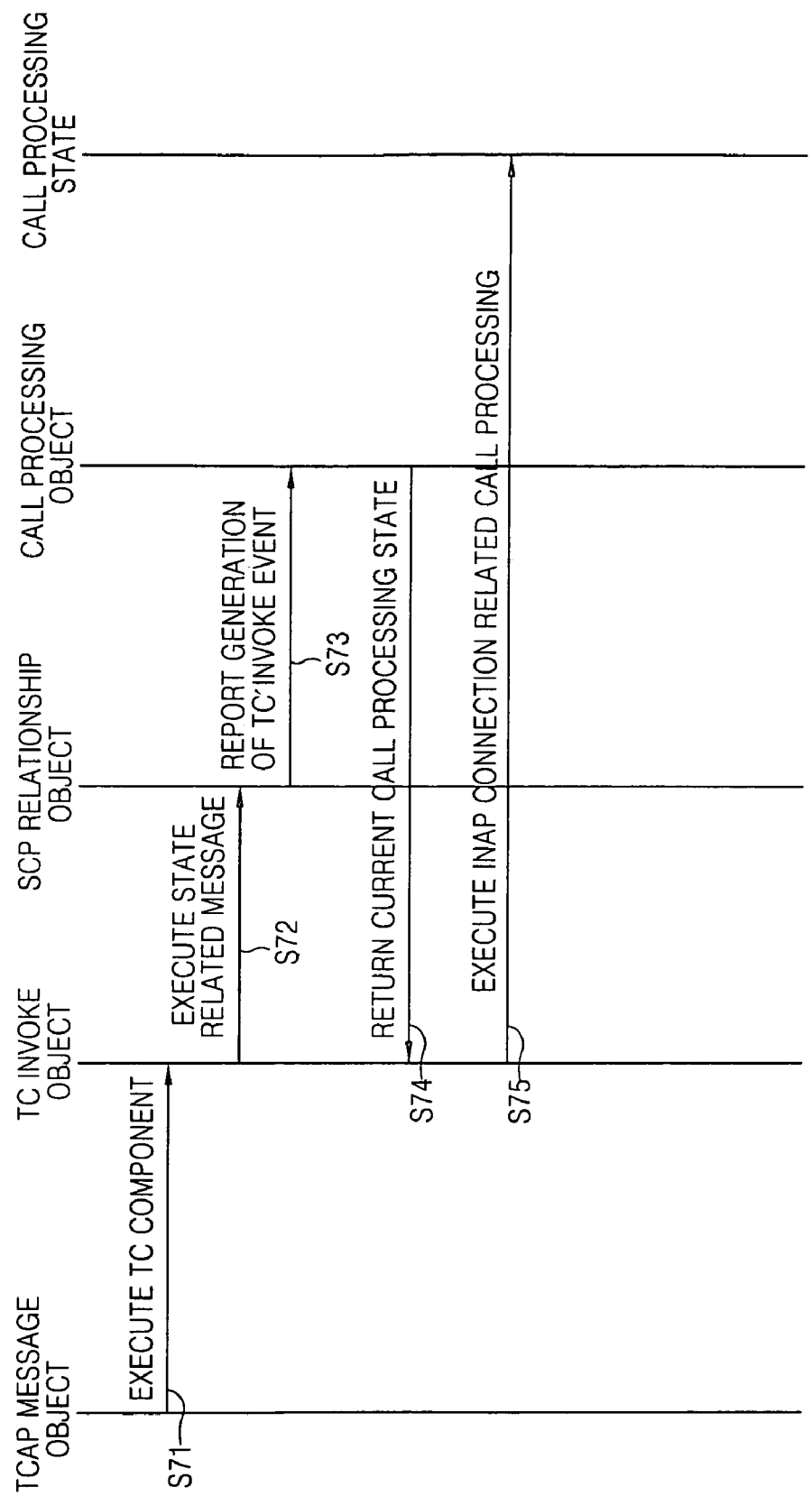
FIG. 15 shows a procedure of executing the TC component of the TCAP messages of FIG. 13.

The procedure of executing the TC component of the TCAP message is performed as shown in FIG. 15. The TC component is executed to be applied to an application corresponding to the INAP operation. For this, the TCAP message object 32 sequentially carries out component execution functions to execute the TC component of the TCAP message (S71). Here, the TC invoke object 46 inherits the TC component object 41 whereas the connection related INAP object 46-1 inherits the TC invoke object 46. That is, since execution of the TC component means performance of the connection related INAP object 46-1, the INAP object 46-1 makes the SCP relationship object 33 carry out a state related message (S72). Then, the SCP relationship object 33 informs a call processing object thereof that the TC invoke event of the connection related INAP object 46-1 is created (S73), and the call processing object returns the current call processing state thereof with respect to the event to the TC invoke related INAP object 46-1 (S74). Here, the TC invoke related INAP object 46-1 executes an INAP connection related function according to the TC invoke event with respect to the current call processing state, to carry out a corresponding call processing. This call processing is performed by the call processing object of the SSP (S75).

The procedure (S69) of ending the dialogue with the SCP is carried out as shown in FIG. 16, to eliminate the TCAP dialogue object 31 and SCP relationship object 33 which are related with the dialogue finished. When the TCAP dialogue object 31 calls a dialogue ending function through the upper TCAP dialogue state object 34 (S81 and S82), the dialogue ending function is called by the SCP relationship object 33 to generate a call processing event indicating ending of a SCP relationship in the call processing object that the dialogue ending function inherits (S83). When the SCP relationship object 33 makes the generated SCP relationship ending event to carry out a call continuance function (S84), the SCP relationship ending event informs the call processing object the generation of event (S85). The call processing object returns the current call processing state thereof with respect to the event to the SCP relationship ending event (S86).

When the SCP relationship ending event calls a SCP relationship ending function in the current call processing state (S87), the call processing state calls a SCP relationship removal function to eliminate the SCP relationship object 33 of the call processing object (S88). Upon completion of the role of the SCP relationship ending event, a deletion operation is used to delete the SCP relationship ending event (S89) and then delete the SCP relationship object 33 that is managing the TCAP dialogue management object 61 (S90).

Other TC primitives and TC components can be processed through the same method as the procedure of processing the TC primitive indicating TC beginning and the TC component indicating TC invoke according to the aforementioned INAP software blocks of the SSP. This message processing is carried out in a manner that the TCAP dialogue state is changed or maintained while the TC primitive is processed first and then the TC component is executed all the time.

As described above, the INAP processing method for communication between the SSP and TCAP according to the present invention allows various applications using the INAP in the SSP to be able to freely communicate with the TCAP. Furthermore, the software blocks for processing the INAP is object-oriented-designed and realized to improve reutilization thereof so that only INAP messages are added, changed and deleted without changing the applications using the software blocks to be applied to a new system and, simultaneously, the maintenance becomes simplified.

Although specific embodiments including the preferred embodiment have been illustrated and described, it will be obvious to those skilled in the art that various modifications may be made without departing from the spirit and scope of the present invention, which is intended to be limited solely by the appended claims.

What is claimed is:

1. A method of transmitting an INAP (Intelligent Network Application Protocol) in an IN (Intellectual Network), comprising:
   generating an INAP message object indicating an INAP initial setting through an INAP factory object;
   obtaining an invoke ID and dialogue ID from a TCAP (Transaction Capabilities Application Part) dialogue object, to set them in the INAP message object;
   sending the INAP message object through the TCAP dialogue object such that the INAP message object calls a transmission component function of the TCAP dialogue object using the INAP object itself as a parameter;
   issuing a component addition command, to add the INAP message object to a TCAP message object; and
   generating and executing different transmission TCAP events based on a dialogue state, to send the INAP message and delete the object after sending the message.

2. The method as claimed in claim 1, wherein generating and executing different transmission TCAP events based on the current TCAP dialogue state to send and delete the INAP message object includes:
   inheriting the INAP object from a TC component object, to make a TC primitive object into TC beginning in a TCAP dialogue idle state;
   obtaining information required for the IC beginning from an SCP relationship object, to set the information in the TC primitive;
   issuing a TC primitive addition command to add the TC primitive to the TCAP message to which the TC component was added previously and to send it; and
   giving a command of transferring to an initial state, to transfer the TCAP dialogue object from the idle state into the initial state.

3. The method as claimed in claim 2, wherein issuing a TC primitive addition command to add the TC primitive to the TCAP message to which the TC component was added previously and to send it includes:
   processing the TC component into a format capable of being used in the TCAP or its lower network protocol;
   loading the processed TC component in a message data region, which is going to be transmitted to the TCAP, to send it to the TCAP; and
   sending the TC component to the TCAP, and then transmitting the TC primitive of the TCAP message.

4. The method as claimed in claim 3, wherein transmitting the TC primitive of the TCAP message includes:
   processing the TC primitive into a format capable of being used in the TCAP and its lower network protocol; and
   loading the processed TC primitive in a message data region, which is going to be transmitted to the TCAP, to send it to the TCAP.

5. A method of receiving an INAP (Intelligent Network Application Protocol) in an IN (Intellectual Network), comprising:
   when aTC primitive is received from a TCAP (Transactions Capabilities Application Part), generating a new TC beginning object for processing the received TC primitive;
   finding a corresponding SCP (Service Control Point) relationship object using a dialogue ID included in the received TC primitive;
   adding the new TC beginning object to a TCAP message by using the SCP relationship object;
   when only the TC primitive is received without accompanying a TC component, executing the TC primitive to which the TC beginning object was added; and
   performing a corresponding call processing, and then deleting the SCP relationship object to finish a dialogue with the SCP,
   wherein executing the TC primitive to which the TC beginning object was added includes:
      when only the TC primitive is received, executing the TC primitive;
      when a TC component is received together with the TC primitive, processing the TC component while withholding the execution of the TC primitive; and
      carrying out the withheld TC primitive, and then executing the processed TC component.

6. The method as claimed in claim 5, wherein generating the TC beginning object includes generating a same TC primitive as a type of a received INAP message and decoding the received INAP message.

7. The method, as claimed in claim 5, wherein finding the corresponding SCP relationship object using a dialogue ID included in the received TC primitive includes generating a new SCP relationship object through a TCAP dialogue object when the dialogue ID was not found.

8. The method as claimed in claim 5, wherein processing the TC component includes:
   when the TC component is received from the TCAP, analyzing an operation code loaded in a TC invoke object included in the received TC primitive;
   generating a connection related INAP object when the operation code corresponds to an INAP connection related operation code;
   executing the INAP object to find a corresponding SCP relationship object using a dialogue ID included in the received TC component;
   commanding the SCP relationship object to add a TC component object, to add the TC component object to the TCAP message; and
   executing the TC component.

9. The method as claimed in claim 5, wherein executing the TC primitive includes:
   generating a TC primitive event indicating TC beginning, and changing the TCAP dialogue state corresponding to the idle state;
   finding a corresponding SCP using address information of the TC beginning object, and then changing the TCAP dialogue state into a full duplex state;
   when a TC component is included in the TCAP message, executing the TC component; and
   ending a TCAP dialogue object when the TCAP dialogue state is changed into an ending state, and finishing a dialogue with the SCP.

10. The method as claimed in claim 5, wherein executing the TC primitive includes:
    generating a TC primitive event indicating TC beginning, and changing the TCAP dialogue state corresponding to the idle state;
    finding a corresponding SCP using address information of the TC beginning object, and then changing the TCAP dialogue state into the full duplex state;
    when a TC component is included in the TCAP message, executing the TC component; and ending the TCAP dialogue object when the TCAP dialogue state is changed into the ending state, and finishing the dialogue with the SCP.

11. The method as claimed in claim 5, wherein executing the TC component includes:
   executing a component execution function, to inherit the TC component object and connection related INAP object;
   reporting generation of a TC invoke event through a SCP relationship object;
   returning the current call processing state to a TC invoke related INAP object for the reported event; and
   performing a corresponding call processing according to the TC invoke event with respect to the current call processing state.

12. The method as claimed in claim 5, wherein ending the dialogue with the SCP includes:
   calling a dialogue ending function, to generate a call processing event indicating conclusion of a SCP relationship;
   reporting the generated SCP relationship ending event to a call processing object such that the current call processing state is returned; and
   deleting the SCP relationship ending event, and then deleting the corresponding SCP relationship object to finish the dialogue with the SCP.

13. A method of processing an INAP (Intelligent Network Application Protocol) for communication between a SSP (Service Switching Point) and TCAP (Transaction Capabilities Application Part), comprising:
   the SSP generating a TC component to be sent to an SCP;
   allocating an invoke ID and dialogue ID to the generated TC component;
   generating a TC primitive corresponding to a state of the allocated dialogue;
   sequentially encoding the generated TC component and TC primitive in formats suitable for the protocol, to send it to the TCAP through a TCAP interface block;
   receiving an INAP message sent from the TCAP;
   decoding the received INAP message based on its kind;
   finding a corresponding SCP relationship object using the dialogue ID contained in the decoded INAP message;
   when the TC primitive is included in the decoded INAP message, executing the TC primitive; and
   upon execution of corresponding call processing, deleting the found SCP relationship object, to finish a dialogue with the SCP,
   wherein executing the TC primitive includes:
      when the TC primitive is the TC beginning that indicates initiation of the dialogue, generating a TC primitive event representing the TC beginning, and changing a state of the dialogue corresponding to the dialogue ID included in the decoded INAP message from the idle state to the initial state;
      finding a corresponding SCP using address information of a TC beginning and then changing the TCAP dialogue state from the initial state into a full state; and
      when the decoded INAP message contains a TC component, executing the TC component.

14. The method as claimed in claim 13, wherein generating the TC primitive includes:
   generating the TC primitive corresponding to TC beginning that indicates beginning of the dialogue when the state of the allocated dialogue corresponds to an idle state;
   receiving a routing address required for the generated TC primitive from the SCP relationship object and adding it to the TCAP message; and
   changing the state of the allocated dialogue from the idle state to an initial state.

15. The method as claimed in claim 13, wherein executing the TC component includes:
   executing a command corresponding to the operation of the TC component, to carry out a corresponding call processing; and
   upon execution of the TC component, changing the state of the dialogue corresponding to the dialogue ID contained in the decoded INAP message into an ending state and finishing the dialogue.

* * * * *